United States Patent
Zha et al.

(10) Patent No.: US 10,861,107 B2
(45) Date of Patent: Dec. 8, 2020

(54) INTERACTION SYSTEM AND METHOD, CLIENT, AND BACKGROUND SERVER

(71) Applicant: Tencent Technology (Shenzhen) Company Limited, Shenzhen (CN)

(72) Inventors: Wen Zha, Shenzhen (CN); Kaibin Chen, Shenzhen (CN); Changpeng Pan, Shenzhen (CN); Dong Huang, Shenzhen (CN); Linping Tang, Shenzhen (CN); Ge Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 174 days.

(21) Appl. No.: 15/709,863

(22) Filed: Sep. 20, 2017

(65) Prior Publication Data

US 2018/0012308 A1    Jan. 11, 2018

Related U.S. Application Data

(63) Continuation-in-part of application No. PCT/CN2016/095770, filed on Aug. 17, 2016.

(30) Foreign Application Priority Data

Sep. 23, 2015   (CN) .......................... 2015 1 0613379

(51) Int. Cl.
| | |
|---|---|
| *G06Q 50/00* | (2012.01) |
| *H04L 12/58* | (2006.01) |
| *G06Q 20/02* | (2012.01) |
| *G06Q 30/02* | (2012.01) |
| *G06Q 20/30* | (2012.01) |

(52) U.S. Cl.
CPC ............. *G06Q 50/01* (2013.01); *G06Q 20/02* (2013.01); *G06Q 30/0236* (2013.01); *H04L 51/32* (2013.01); *G06Q 20/30* (2013.01)

(58) Field of Classification Search
CPC .... G06Q 50/01; G06Q 20/02; G06Q 30/0236; G06Q 20/30; G06Q 20/384;
(Continued)

(56) References Cited

U.S. PATENT DOCUMENTS

| | | | |
|---|---|---|---|
| 2013/0253994 A1* | 9/2013 | Brower | G06Q 20/22 705/12 |
| 2014/0164088 A1* | 6/2014 | Rorabaugh | G06Q 30/0226 705/14.27 |

(Continued)

FOREIGN PATENT DOCUMENTS

| | | |
|---|---|---|
| CN | 102130949 A | 7/2011 |
| CN | 103780650 A | 5/2014 |

(Continued)

OTHER PUBLICATIONS

Bandcamp webpage for Glen Phillips Sampler digital album (retrieved form the Wayback Machine as of Nov. 18, 2014) (acessed Jun. 23, 2019) <https://web.archive.org/web/20141118041410/http://glenphillips.bandcamp.com/album/glen-phillips-sampler> (Year: 2014).*

(Continued)

*Primary Examiner* — Lynda Jasmin
*Assistant Examiner* — Shaun D Sensenig
(74) *Attorney, Agent, or Firm* — Morgan, Lewis & Bockius LLP

(57) ABSTRACT

A method, including: at a client terminal of a user of a social network platform: displaying a first network resource published by a first resource publisher; displaying a resource rewarding affordance in association with the first network resource or an identifier of the first resource publisher; detecting user selection of the resource rewarding affordance; and in accordance with a determination that the resource rewarding affordance has been selected while the resource rewarding affordance is displayed in association (Continued)

with the first network resource or the identifier of the first resource publisher, initiating a resource rewarding operation to reward the first resource publisher on the social network platform, wherein the resource rewarding operation transfers reward goods from a social network account of the user to a social network account of the first resource publisher on the social network platform.

20 Claims, 10 Drawing Sheets

(58) Field of Classification Search
CPC ............. G06Q 20/3255; G06Q 20/386; G06Q 30/0207; G06Q 30/0211; G06Q 30/0024; G06Q 30/0251; H04L 51/32; H04L 51/046; H04L 51/36; H04L 51/38; H04L 67/02; H04L 67/42
See application file for complete search history.

(56) References Cited

U.S. PATENT DOCUMENTS

| 2014/0173648 | A1* | 6/2014 | Ball | H04N 21/25 |
| | | | | 725/25 |
| 2015/0067878 | A1* | 3/2015 | Steelberg | H04W 12/02 |
| | | | | 726/26 |
| 2015/0222586 | A1* | 8/2015 | Ebersman | G06F 17/276 |
| | | | | 715/752 |
| 2018/0373683 | A1* | 12/2018 | Hullette | G06Q 50/01 |

FOREIGN PATENT DOCUMENTS

| CN | 104462218 A | 3/2015 |
| CN | 104700258 A | 6/2015 |
| CN | 104899753 A | 9/2015 |
| CN | 104901864 A | 9/2015 |
| CN | 105337843 A | 2/2016 |

OTHER PUBLICATIONS

Bandcamp for Fans, Bandcamp Daily, Jan. 10, 2013 (accessed Jun. 23, 2019) <https://daily.bandcamp.com/2013/01/10/bandcamp-for-fans/> (Year: 2013).*
Tencent Technology, ISR, PCT/CN2016/095770, Nov. 3, 2016, 2 pgs.
Tencent Technology, WO, PCT/CN2016/095770, Nov. 3, 2016, 7 pgs.
Tencent Technology, IPRP, PCT/CN2016/095770, Mar. 27, 2018, 8 pgs.

* cited by examiner

INTERACTION SYSTEM AND METHOD, CLIENT, AND BACKGROUND SERVER

RELATED APPLICATION

This application is a continuation-in-part application of PCT/CN2016/095770, entitled "INTERACTION SYSTEM AND METHOD, CLIENT, AND BACKGROUND SERVER" filed on Aug. 17, 2016, which claims priority to Chinese Patent Application No. 201510613379.8, filed with the State Intellectual Property Office of the People's Republic of China on Sep. 23, 2015, and entitled "INTERACTION SYSTEM AND METHOD, CLIENT, AND BACKGROUND SERVER", both of which are incorporated herein by reference in their entirety.

FIELD OF THE TECHNOLOGY

Embodiments of the present technology relate to the field of computer and Internet technologies, and in particular, to an interaction system and method, a client, and a background server.

BACKGROUND OF THE DISCLOSURE

With continuous development of computer and Internet technologies, the Internet provides various network resources for users.

A network resource is classified into free network resource and paid network resource according to whether the network resource is charged. The free network resource is a network resource that a user can obtain without paying a network resource publisher, and the paid network resource is a network resource that a user cannot obtain before paying a network resource publisher. For example, an emoticon package in an instant messaging application is classified into free emoticon package and paid emoticon package. A user needs to pay a particular amount of money to download a paid emoticon package.

SUMMARY

To resolve problems in the existing technology that utilization and a propagation rate of a paid network resource are relatively low, embodiments of the present technology provide an interaction system and method, a client, and a background server. The technical solutions are as follows:

A first aspect provides an interaction system, including: a resource publisher client, a background server, and a resource consumer client;

the resource publisher client being configured to release a network resource to the background server;

the background server being configured to share the network resource to at least one resource consumer client;

the resource consumer client being configured to display a presentation window of the network resource, the presentation window including a resource rewarding affordance corresponding to the network resource, and the resource rewarding affordance being an operation affordance used for rewarding a resource to a publisher of the network resource;

the resource consumer client being further configured to send a resource rewarding instruction for the network resource to the background server according to a resource rewarding operation triggered based on the resource rewarding affordance;

the background server being further configured to execute the resource rewarding instruction and send reward feedback information to the resource consumer client according to the resource rewarding instruction, the reward feedback information being used to indicate reward goods obtained due to the resource rewarding operation; and the resource consumer client being further configured to present the reward feedback information.

A second aspect provides an interaction method, applied to a system including a resource publisher client, a background server, and a resource consumer client, and the method including:

releasing, by the resource publisher client, a network resource to the background server;

sharing, by the background server, the network resource to at least one resource consumer client;

displaying, by the resource consumer client, a presentation window of the network resource, the presentation window including a resource rewarding affordance corresponding to the network resource, and the resource rewarding affordance being an operation affordance used for rewarding a resource to a publisher of the network resource;

sending, by the resource consumer client, a resource rewarding instruction for the network resource to the background server according to a resource rewarding operation triggered based on the resource rewarding affordance;

executing, by the background server, the resource rewarding instruction and sending reward feedback information to the resource consumer client according to the resource rewarding instruction, the reward feedback information being used to indicate reward goods obtained due to the resource rewarding operation; and presenting, by the resource consumer client, the reward feedback information.

A third aspect provides an interaction method, applied to a resource consumer client, and the method including:

displaying a presentation window of a network resource, the presentation window including a resource rewarding affordance corresponding to the network resource, and the resource rewarding affordance being an operation affordance used for rewarding a resource to a publisher of the network resource;

sending a resource rewarding instruction for the network resource to a background server according to a resource rewarding operation triggered based on the resource rewarding affordance;

receiving reward feedback information that is sent by the background server after the background server executes the resource rewarding instruction, the reward feedback information being used to indicate reward goods obtained due to the resource rewarding operation; and presenting the reward feedback information.

A fourth aspect provides an interaction method, applied to a background server, and the method including:

obtaining a network resource released by a resource publisher client;

sharing the network resource to at least one resource consumer client;

receiving a resource rewarding instruction that is sent by the resource consumer client for the network resource, the resource rewarding instruction being generated by the resource consumer client according to a resource rewarding operation that is triggered based on a resource rewarding affordance included on a presentation window of the network resource, and the resource rewarding affordance being an operation affordance used for rewarding a resource to a publisher of the network resource;

executing the resource rewarding instruction; and sending reward feedback information to the resource consumer client according to the resource rewarding instruction, the reward feedback information being used to indicate reward goods obtained due to the resource rewarding operation.

A fifth aspect provides a client, including:

a window display module, configured to display a presentation window of a network resource, the presentation window including a resource rewarding affordance corresponding to the network resource, and the resource rewarding affordance being an operation affordance used for rewarding a resource to a publisher of the network resource;

an instruction sending module, configured to send a resource rewarding instruction for the network resource to a background server according to a resource rewarding operation triggered based on the resource rewarding affordance;

a reward receiving module, configured to receive reward feedback information that is sent by the background server after the background server executes the resource rewarding instruction, the reward feedback information being used to indicate reward goods obtained due to the resource rewarding operation; and a reward presentation module, configured to present the reward feedback information.

A sixth aspect provides a background server, including:

a resource obtaining module, configured to obtain a network resource released by a resource publisher client;

a resource sharing module, configured to share the network resource to at least one resource consumer client;

an instruction receiving module, configured to receive a resource rewarding instruction that is sent by the resource consumer client for the network resource, the resource rewarding instruction being generated by the resource consumer client according to a resource rewarding operation that is triggered based on a resource rewarding affordance included on a presentation window of the network resource, and the resource rewarding affordance being an operation affordance used for rewarding a resource to a publisher of the network resource;

an instruction execution module, configured to execute the resource rewarding instruction; and a reward feedback module, configured to send reward feedback information to the resource consumer client according to the resource rewarding instruction, the reward feedback information being used to indicate reward goods obtained due to the resource rewarding operation.

Beneficial effects of the technical solutions provided in the embodiments of the present technology include:

A resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

BRIEF DESCRIPTION OF THE DRAWINGS

To describe the technical solutions in the embodiments of the present technology more clearly, the following briefly describes the accompanying drawings required for describing the embodiments. Apparently, the accompanying drawings in the following description show merely some embodiments of the present technology, and a person of ordinary skill in the art may still derive other drawings from these accompanying drawings without creative efforts.

DESCRIPTION OF EMBODIMENTS

To make the objectives, technical solutions, and advantages of the present technology clearer, the following further describes the embodiments of the present technology in detail with reference to the accompanying drawings.

Implementation Environment

Figure 1:
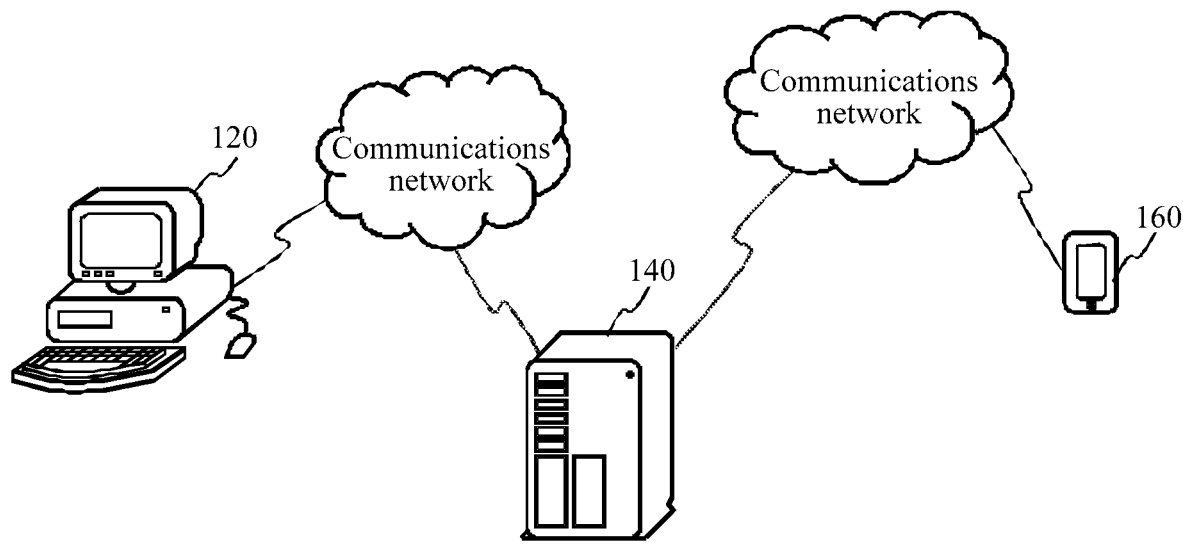
FIG. 1 is a schematic diagram of an implementation environment according to an embodiment of the present technology.

Referring to FIG. 1, FIG. 1 is a schematic diagram of an implementation environment involved in this embodiment of the present technology. The implementation environment includes a publisher terminal 120, a background server 140, and a consumer terminal 160. The publisher terminal 120 and the consumer terminal 160 separately establish a communication connection with the background server 140 by means of a communications network. The communications network may be a wired network or a wireless network.

The publisher terminal 120 is a terminal device used by a publisher of a network resource. The publisher terminal 120 may be an electronic device, such as a mobile phone, a tablet computer, an e-book reader, a multi-media player, a laptop computer, or a desktop computer. The publisher terminal 120 runs a resource publisher client. The resource publisher client may be an application client, or may be a web page client. The publisher of the network resource may log on to the background server 140 by means of the resource publisher client, and release the network resource to the background server 140. In this embodiment of the present technology, a type of a network resource is not specifically limited. For example, the type of the network resource includes, but is not limited to: emoticon package, video, music, picture, article, and application (APP).

The background server 140 may be one server, or a server cluster including a plurality of servers, or a cloud computing center. The background server may be a server of a social network platform that supports social network interactions of many users using a social network client application of the social network platform. The social network interaction includes exchanging network resources, such as emoticons, images, web links, payments, media files, articles, stickers, games, etc., as well as instant messages, in conversation interfaces or bulletins of the social network platform.

The consumer terminal 160 is a terminal device used by a consumer of the network resource. The consumer terminal 160 may be an electronic device, such as a mobile phone, a tablet computer, an e-book reader, a multi-media player, a laptop computer, or a desktop computer. The consumer terminal 160 runs a resource consumer client. The resource consumer client may be an application client, or may be a web page client. A common user logs on to the background server 140 by means of the resource consumer client, and obtains, from the background server, the network resource released by the publisher.

In an actual application, the resource publisher client and the resource consumer client may be two clients having different functions. The resource publisher client has a function of releasing a network resource to the background server, and the resource consumer client has a function of receiving a network resource from the background server. Alternatively, the resource publisher client and the resource consumer client may be two clients having same functions. The clients have both a function of releasing a network resource to the background server and a function of obtaining a network resource from the background server. When a client is configured to implement a function on a side of the resource publisher client in an example of a system/method of the present disclosure, the client is used as the resource publisher client. When a client is configured to implement a function on a side of the resource consumer client in the example of the system/method of the present disclosure, the client is used as the resource consumer client. Correspondingly, both the publisher terminal and the consumer terminal are terminal devices. When a client running on a terminal device is configured to implement the function on the side of the resource publisher client in the example of the system/method of the present disclosure, the terminal device is used as the publisher terminal. When a client running on a terminal device is configured to implement the function on the side of the resource consumer client in the example of the system/method of the present disclosure, the terminal device is used as the consumer terminal. In an actual application, for a same client, the client may be used as the resource publisher client, or may be used as the resource consumer client. For a same terminal, the terminal may be used as the publisher terminal, or may be used as the consumer terminal.

Architecture of a Computer

Figure 2:
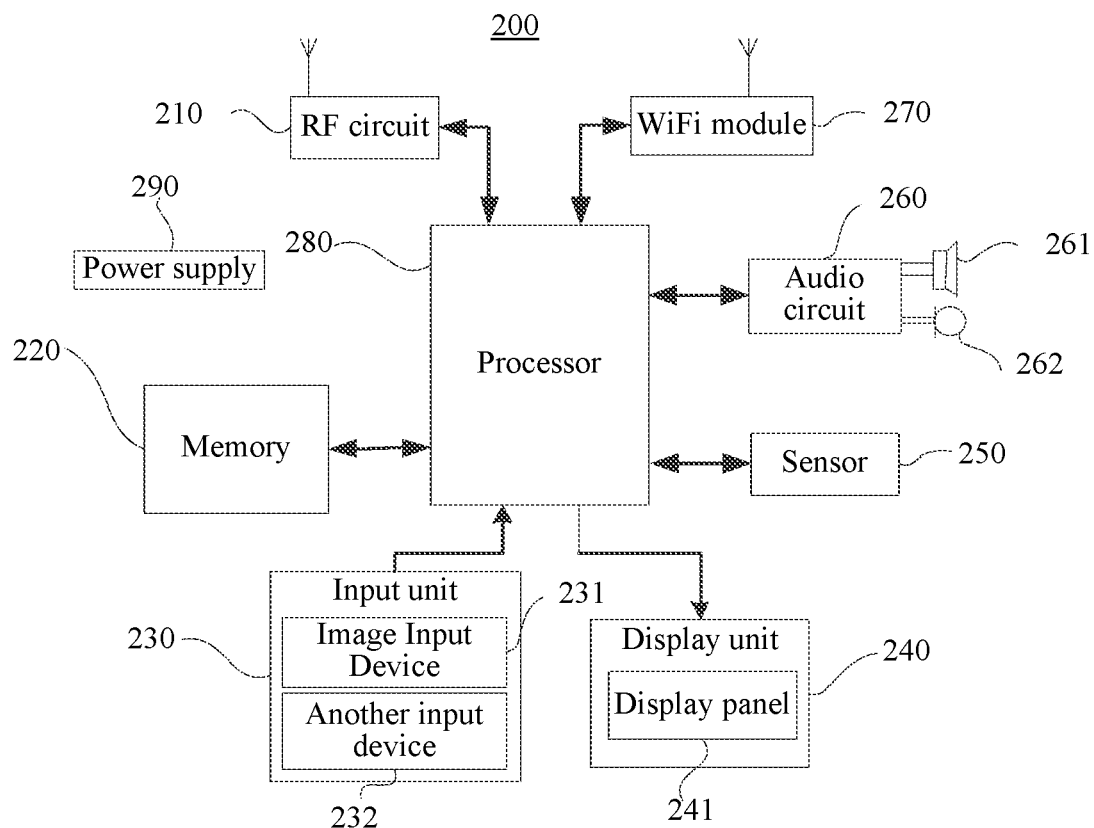
FIG. 2 is a schematic structural diagram of a terminal according to an embodiment of the present technology.

Referring to FIG. 2, FIG. 2 is a schematic structural diagram of a terminal according to an embodiment of the present technology. The terminal may be the publisher terminal 120 or the consumer terminal 160 in the implementation environment shown in FIG. 1. Specifically:

The terminal device 200 may include components such as a radio frequency (RF) circuit 210, a memory 220 including one or more computer readable storage media, an input unit 230, a display unit 240, a sensor 250, an audio circuit 260, a wireless fidelity (WiFi) module 270, a processor 280 including one or more processing cores, and a power supply 290. A person skilled in the art may understand that, a structure of the terminal shown in FIG. 2 does not constitute a limitation to the terminal, and the terminal may include more components or fewer components than those shown in the figure, or combine some components, or have a different component deployment. In the drawings:

The RF circuit 210 may be configured to receive and send signals during an information receiving and sending process or a call process, particularly, after receiving downlink information of a base station, deliver the downlink information of the base station to the one or more processors 280 for processing, and in addition, send related uplink data to the base station. Generally, the RF circuit 210 includes, but is not limited to, an antenna, at least one amplifier, a tuner, one or more oscillators, a subscriber identity module (SIM) card, a transceiver, a coupler, a low noise amplifier LNS( ) and a duplexer. In addition, the RF circuit 210 may also communicate with a network and another device by means of wireless communication. The wireless communication may use any communications standard or protocol, including but not limited to: Global System for Mobile communications (GSM), general packet radio service (GPRS), code division multiple access (CDMA), wideband code division multiple access (WCDMA), Long Term Evolution (LTE), e-mail, and short message service (SMS).

The memory 220 may be configured to store a software program and module. The processor 280 runs the software program and module stored in the memory 220, to implement various functional applications and data processing. The memory 220 may mainly include a program storage area and a data storage area, where the program storage area may store an operating system, an application program required by at least one function (such as a sound playback function and an image display function), and the like; and the program storage area may store data (such as audio frequency data and an address book) created according to the use of the terminal 200, and the like. In addition, the memory 220 may include a high-speed random access memory (RAM), or may include a non-volatile memory such as at least one disk storage device, a flash storage device, or another volatile solid-state storage device. Correspondingly, the memory 220 may include a storage controller, so that the processor 280 and the input unit 230 access the memory 220.

The input unit 230 may be configured to receive input figure or character information, and generate a keyboard, mouse, joystick, optical, or trackball signal input related to a user setting and function control. Specifically, the input unit 230 may include an image input device 231 and another input device 232. The image input device 231 may be a camera, or may be a photoelectric scanning device. In addition to the image input device 231, the input unit 230 may further include another input device 232. Specifically, the another input device 232 may include, but is not limited to, one or more of a physical keyboard, a functional key (such as a volume control key or a switch key), a trackball, a mouse, and a joystick. The input device may also include a touch-sensitive surface.

The display unit 240 may be configured to display information input by the user or information provided for the user, and various graphical user interfaces of the terminal

200. These graphical user interfaces may be formed by a graph, a text, an icon, a video, or any combination thereof. The display unit 240 may include a display panel 241. Optionally, the display panel 241 may be configured by using a liquid crystal display (LCD), an organic light-emitting diode (OLED), or the like.

The terminal 200 may further include at least one sensor 250, for example, an optical sensor, a motion sensor, and other sensors. Specifically, the optical sensor may include an ambient light sensor and a proximity sensor, where the ambient light sensor may adjust luminance of the display panel 241 according to brightness of the ambient light. The proximity sensor may switch off the display panel 241 and/or backlight when the terminal 200 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 200 are not further described herein.

The audio circuit 260, a loudspeaker 261, and a microphone 262 may provide an audio interface between the user and the terminal 200. The audio circuit 260 may convert received audio data into an electric signal and transmit the electric signal to the loudspeaker 261. The loudspeaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 180 sends the audio data to, for example, another apparatus by means of the RF circuit 210, or outputs the audio data to the memory 220 for further processing. The audio circuit 260 may further include an earplug jack, so as to provide communication between a peripheral earphone and the terminal 200.

WiFi is a short distance wireless transmission technology. The terminal 200 may help, by means of the WiFi module 270, the user to receive and send e-mails, browse a web page, access streaming media, and so on, which provides wireless broadband Internet access for the user. Although FIG. 2 shows the WiFi module 270, it may be understood that the WiFi module is not a necessary component of the terminal 200, and when required, the WiFi module may be omitted as long as the scope of the essence of the present technology is not changed.

The processor 280 is a control center of the terminal 200, and is connected to various parts of the mobile phone by means of various interfaces and lines. By running or executing the software program and/or module stored in the memory 220, and invoking data stored in the memory 220, the processor 180 executes various functions and data processing of the terminal 200, thereby executing overall monitoring on the mobile phone. Optionally, the processor 280 may include the one or more processing cores. Preferably, the processor 280 may integrate an application processor and a modem. The application processor mainly processes an operating system, a user interface, an application program, and the like. The modem mainly processes wireless communication. It may be understood that the foregoing modem processor may be not integrated into the processor 280.

The terminal 200 may further include the power supply 290 (for example, a battery) that supplies power for various components. Preferably, the power supply may be logically connected to the processor 280 by means of a power management system, so as to implement a function such as charging, discharging and power consumption management by means of the power management system. The power supply 290 may further include one or more of a direct current or alternate current power supply, a re-charging system, a power supply fault detection circuit, a power supply converter or an inverter, a power supply state indicator, and any other components.

Although not shown in the figure, the terminal 200 may further include a camera, a Bluetooth module, and the like, and details are not described herein.

The terminal 200 further includes a memory and one or more programs. The one or more programs are stored in the memory, and are executed by one or more processors. The program includes an instruction used to execute operations on a side of a resource publisher client in the following example of the method, and/or an instruction used to execute operations on a side of a resource consumer client in the following example of the method.

Figure 3:
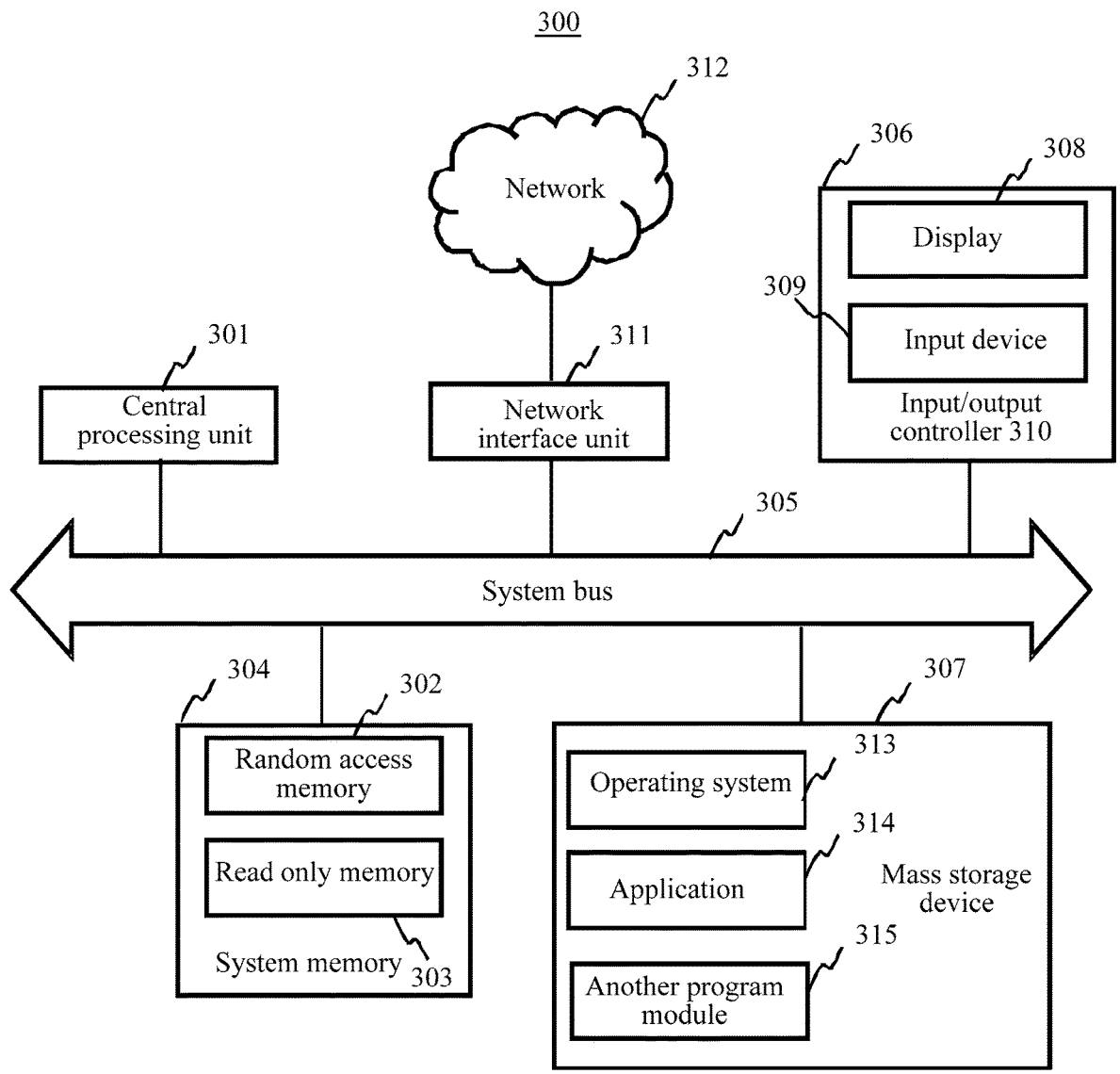
FIG. 3 is a schematic structural diagram of a server according to an embodiment of the present technology.

FIG. 3 is a schematic structural diagram of a server according to an embodiment of the present technology. The server may be the background server 140 in the implementation environment shown in FIG. 1. Specifically:

The server 300 includes a central processing unit (CPU) 301, a system memory 304 including a RAM 302 and a ROM 303, and a system bus 305 connecting the system memory 304 and the CPU 301. The server 300 further includes a basic input/output system (I/O system) 306 used for transmitting information between components in a computer, and a mass storage device 307 used for storing an operating system 313, an application program 314, and another program module 315.

The basic I/O system 306 includes a display 308 used for displaying information, and an input device 309, such as a mouse and a keyboard, used for a user to input information. The display 308 and the input device 309 are connected to an input/output controller 310 of the system bus 305, so as to be connected to the CPU 301. The basic I/O system 306 may further include the input/output controller 310, so as to receive and process input of multiple other devices, such as the keyboard, the mouse, or an electronic stylus. Similarly, the input/output controller 310 further provides output to an output device, such as a display screen or a printing machine.

The mass storage device 307 is connected to a mass storage controller (not shown) of the system bus 305, so as to be connected to the CPU 301. The mass storage device 307 and an associated computer readable medium provide non-volatile storage to the server 300. That is, the mass storage device 307 may include a computer readable medium (not shown), such as a hard disk or a CD-ROM drive.

Without loss of generality, the computer readable medium may include a computer storage medium and a communication medium. The computer storage medium includes a volatile and non-volatile, removable and non-removable medium that is implemented by using any method or technology used for storing information, such as a computer readable instruction, a data structure, a program module, or other data. The computer storage medium includes solid storage, such as a RAM, a ROM, an EPROM, an EEPROM, or a flash memory; optical storage, such as a CD-ROM, and DVD; and a magnetic storage device, such as a cassette, a tape, and magnetic storage. Certainly, a person skilled in the art may know that the computer storage medium is not limited to the foregoing. The system memory 304 and the mass storage device 307 may be generally called as a memory.

According to the embodiments of the present technology, the server 300 may further be connected to a remote computer on a network through a network, such as Internet. That is, the server 300 may be connected to a network 312 by being connected to a network interface unit 311 on the system bus 305, or, may be connected to a network of another type or a remote computer system (not shown) by using the network interface unit 311.

The memory further includes one or more programs. The one or more programs are stored in the memory and are executed by the CPU. The program includes an instruction used to execute operations on the side of the background server in the following example of the method.

Figure 4:
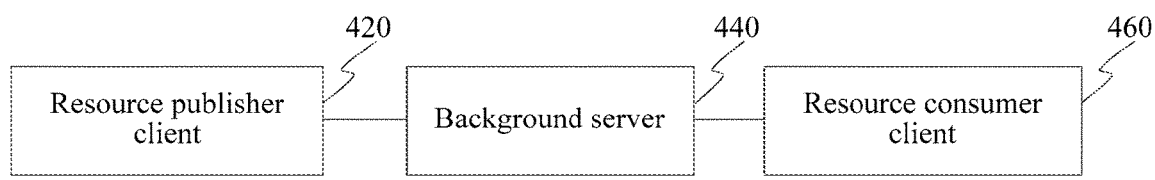
FIG. 4 is a block diagram of an interaction system according to an embodiment of the present technology.

Referring to FIG. 4, FIG. 4 is a block diagram of an interaction system according to an embodiment of the present technology. The interaction system includes a resource publisher client 420, a background server 440, and a resource consumer client 460.

The resource publisher client 420 is configured to release a network resource to the background server 440. A type of the network resource includes, but is not limited to: emoticon package, video, music, picture, article, and APP.

The background server 440 is configured to share the network resource to at least one resource consumer client 460.

The resource consumer client 460 is configured to display a presentation window of the network resource, where the presentation window includes a resource rewarding affordance corresponding to the network resource, and the resource rewarding affordance is an operation affordance used for rewarding a resource to a publisher of the network resource.

The resource consumer client 460 is further configured to send a resource rewarding instruction for the network resource to the background server 440 according to a resource rewarding operation triggered based on the resource rewarding affordance.

The background server 440 is further configured to execute the resource rewarding instruction and send reward feedback information to the resource consumer client 460 according to the resource rewarding instruction, where the reward feedback information is used to indicate reward goods obtained due to the resource rewarding operation.

The resource consumer client 460 is further configured to present the reward feedback information.

In conclusion, in the interaction system provided in this embodiment, a resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

In another optional embodiment provided based on the embodiment shown in FIG. 4, the background server 440 is further configured to obtain at least one piece of user information corresponding to a resource rewarding instruction that is successfully executed for the network resource, where each piece of user information includes a user identifier and a value of a rewarded resource;

the background server 440 is further configured to send the at least one piece of user information to the resource consumer client 460; and the resource consumer client 460 is further configured to sort and display the at least one user identifier according to the value of the rewarded resource.

In another optional embodiment provided based on the embodiment shown in FIG. 4, the background server 440 is specifically configured to:

determine, according to the value of the rewarded resource indicated in the resource rewarding instruction, reward goods corresponding to the value;

generate reward feedback information corresponding to the reward goods; and send the reward feedback information to the resource consumer client 460.

In another optional embodiment provided based on the embodiment shown in FIG. 4, the background server 440 is specifically configured to:

transfer the rewarded resource indicated in the resource rewarding instruction from an account corresponding to the resource consumer client 460 to an account corresponding to the resource publisher client 420.

In another optional embodiment provided based on the embodiment shown in FIG. 4, the reward goods include virtual goods and/or physical goods; and the virtual goods include at least one of a use right of a specified function, a setting right of a specified attribute, and an obtaining right of specified contents.

Figure 5:
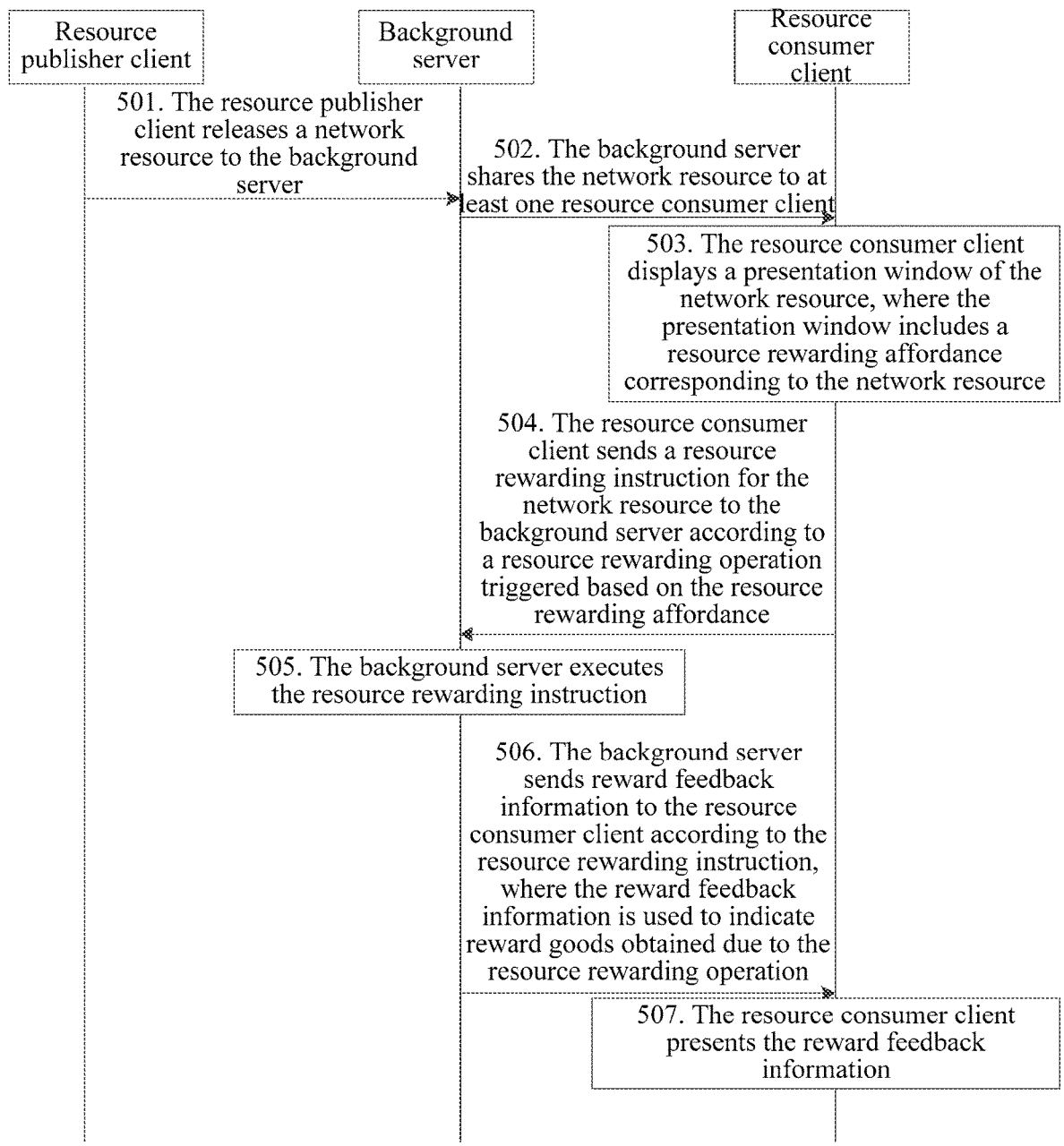
FIG. 5 is a flowchart of an interaction method according to an embodiment of the present technology.

Referring to FIG. 5, FIG. 5 is a flowchart of an interaction method according to an embodiment of the present technology. The interaction method may be applied to the implementation environment shown in FIG. 1. The interaction method may include the following steps.

Step 501. A resource publisher client releases a network resource to a background server.

Step 502. The background server shares the network resource to at least one resource consumer client.

Step 503. The resource consumer client displays a presentation window of the network resource, where the presentation window includes a resource rewarding affordance corresponding to the network resource.

The resource rewarding affordance is an operation affordance used for rewarding a resource to a publisher of the network resource.

Step 504. The resource consumer client sends a resource rewarding instruction for the network resource to the background server according to a resource rewarding operation triggered based on the resource rewarding affordance.

Step 505. The background server executes the resource rewarding instruction.

Step 506. The background server sends reward feedback information to the resource consumer client according to the resource rewarding instruction, where the reward feedback information is used to indicate reward goods obtained due to the resource rewarding operation.

Step 507. The resource consumer client presents the reward feedback information.

In conclusion, in the interaction method provided in this embodiment, a resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

Figure 6A:
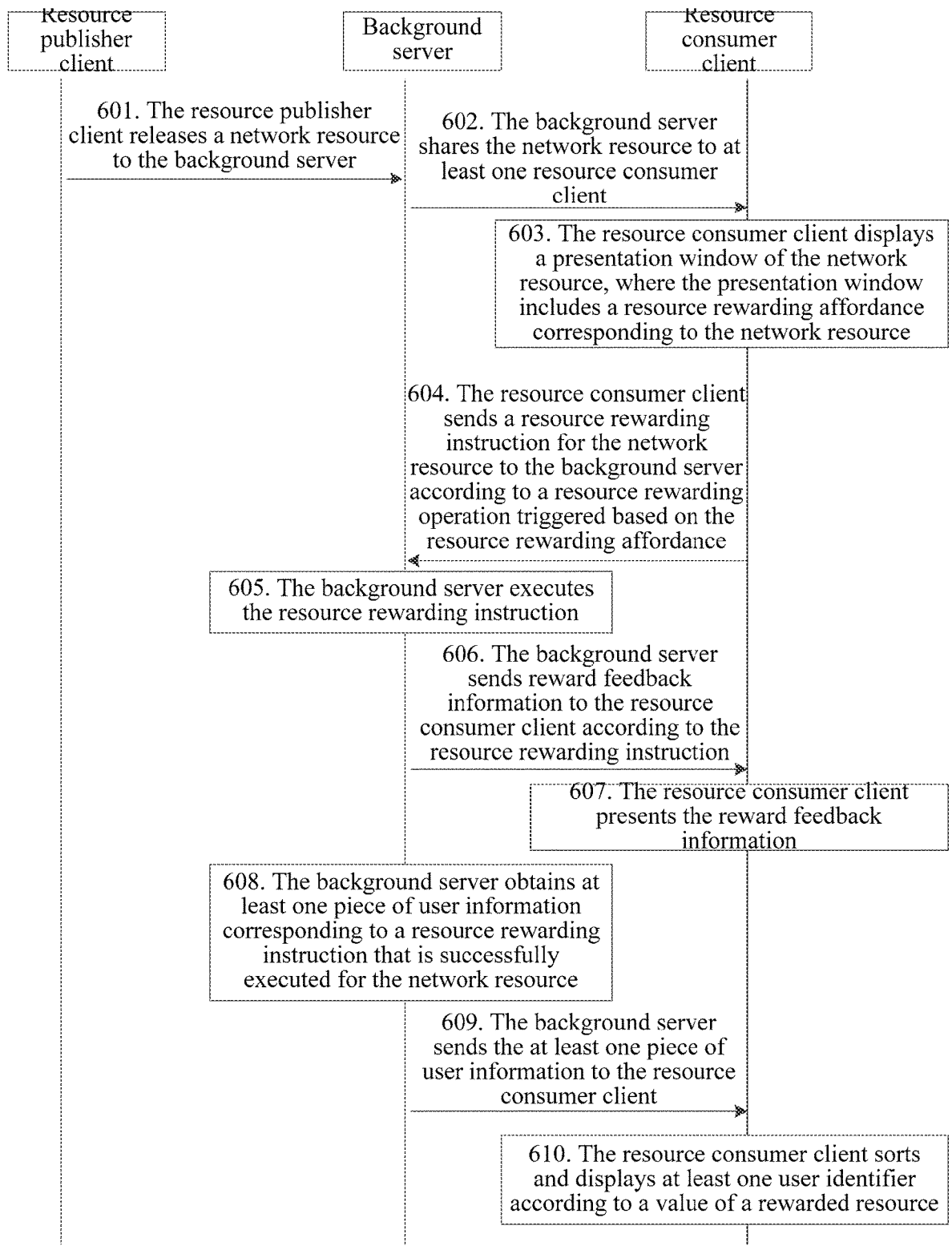
FIG. 6A is a flowchart of an interaction method according to another embodiment of the present technology.

Referring to FIG. 6A, FIG. 6A is a flowchart of an interaction method according to another embodiment of the present technology. This embodiment is described by using an example in which the interaction method is applied to the implementation environment shown in FIG. 1. The interaction method may include the following steps.

Step 601. A resource publisher client releases a network resource to a background server.

A type of the network resource includes, but is not limited to: emoticon package, video, music, picture, article, and APP. The resource publisher client may be an application client, or may be a web page client. A publisher of the network resource may log on to the background server by means of the resource publisher client, and release the network resource to the background server. Correspondingly, the background server stores a correspondence between an identifier corresponding to the network resource and a user account corresponding to the resource publisher client.

Using an example of releasing an emoticon package to the background server, the publisher may open, by means of a browser, an emoticon releasing web page provided by the background server, and enter a corresponding user account and codeword to log on, to release a designed emoticon package to the background server. Correspondingly, the background server stores a correspondence between an identifier corresponding to an emoticon package released by a publisher and a user account of the publisher.

Optionally, the network resource is a free network resource. That is, a user can obtain the network resource without paying the publisher of the network resource.

Step 602. The background server shares the network resource to at least one resource consumer client.

The resource consumer client may be an APP client, such as a social application client, an instant messaging client, a video client, or a music player client. Alternatively, the resource consumer client may be a web page client, such as a browser.

In different embodiments, the at least one resource consumer client may be all resource consumer clients, or a resource consumer client having an association relationship with the resource publisher client, where the association relationship includes, but is not limited to any one of a following and followed relationship, a friend relationship, and a listening relationship, or a randomly selected resource consumer client, or a resource consumer client determined according to a forwarding rule or a recommendation rule, which is not limited in this embodiment of the present technology.

In addition, in step 602, the background server may directly send the network resource to the at least one resource consumer client, or may send a download link corresponding to the network resource to the at least one resource consumer client. The user may download the network resource from the background server by means of the download link when the user determines that the network resource is needed.

Step 603. The resource consumer client displays a presentation window of the network resource, where the presentation window includes a resource rewarding affordance corresponding to the network resource.

The presentation window is used to introduce the network resource to the user. For example, the presentation window may include a brief description corresponding to the network resource, a preview image, information about a publisher, a download tool, user comments, or the like. In this embodiment of present technology, the presentation window further includes the resource rewarding affordance corresponding to the network resource. The resource rewarding affordance is an operation affordance used for rewarding a resource to the publisher of the network resource. Generally speaking, the resource rewarding affordance involved in this embodiment of the present technology is a rewarding affordance. A user may trigger a rewarding operation for the publisher by means of the rewarding affordance.

Figure 6B:
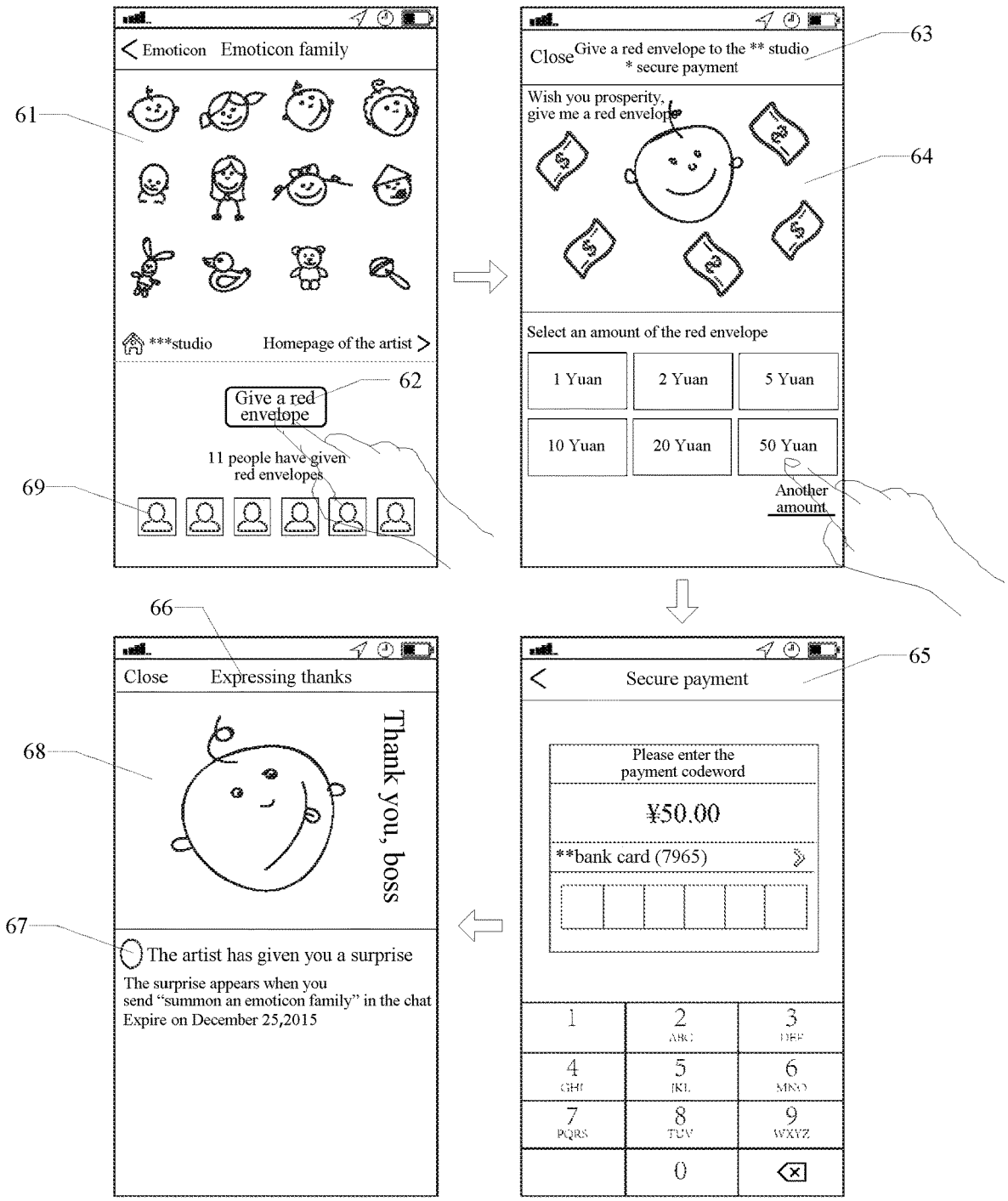
FIG. 6B and FIG. 6C are schematic diagrams of windows involved in the embodiment shown in FIG. 6A.

For example, as shown in FIG. 6B, using an example in which the network resource is an emoticon package "emoticon family", the presentation window 61 includes the resource rewarding affordance, and the resource rewarding affordance is set to a button tool 62 of "giving a red envelope". The user clicks the button tool 62 of "giving a red envelope", to trigger a resource rewarding operation for the publisher "*** studio".

In addition, the resource that is rewarded by the user to the publisher by means of the resource rewarding affordance may be a cash resource, or may be virtual resource. The virtual resource may be flowers, likes, points, ingots, or the like.

Step 604. The resource consumer client sends a resource rewarding instruction for the network resource to the background server according to a resource rewarding operation triggered based on the resource rewarding affordance.

The resource rewarding instruction may include a user account for logging on to the resource consumer client, a value of the rewarded resource (e.g., monetary value or number of stars, points, etc.), and an identifier corresponding to the network resource. The value of the rewarded resource may be set in a system by default, or may be selected by a user in a self-defined manner according to options provided in a system, or may be set by a user in a self-defined manner.

For example, as shown in FIG. 6B, after the user clicks the button tool 62 of "giving a red envelope", a resource rewarding window 63 is entered. The user may select or enter a value of a rewarded resource according to a prompt on the resource rewarding window 63. For example, the user chooses to reward a cash resource of 50 Yuan to the publisher "* studio". In addition, a display region 64 used to attract resource rewarding of the user may be set on the resource rewarding window 63. Contents displayed on the display region 64 may be configured by the publisher. For example, the display region 64 may display media contents such as characters, pictures, cartoons, or videos. After determining the value of the rewarded resource, the user enters a codeword on a payment window 65** to complete the resource rewarding operation. In some embodiments, the display media content is collectable, and the users that provide reward to the content publisher can collect these media content items to form a full collectable set, which serve as an extra incentive for the users to give rewards to the content publishers.

Step 605. The background server executes the resource rewarding instruction.

When the rewarded resource is a cash resource, the background server transfers the rewarded resource indicated in the resource rewarding instruction from an account corresponding to the resource consumer client to an account corresponding to the resource publisher client. In a possible implementation, the background server first transfers the rewarded resource indicated in the resource rewarding instruction from the account corresponding to the resource consumer client to an intermediate account provided by the background server, and then transfers the rewarded resource from the intermediate account to the account corresponding to the resource publisher client. The background server may regularly transfer the rewarded resource from the intermediate account to the account corresponding to the resource publisher client, or may transfer in time the rewarded resource from the intermediate account to the account corresponding to the resource publisher client. In some embodiments, the reward is executed and transferred when predefined conditions are met, e.g., at the end of the month, or when the user has given a thumbs up to the same publisher at least five times, or when the publisher has received less than a predefined amount of rewards from other users, etc.

When the rewarded resource is a virtual resource, the background server adds a value of a rewarded resource corresponding to a current resource rewarding operation to a value of a rewarded resource already obtained by the publisher.

Step 606. The background server sends the reward feedback information to the resource consumer client according to the resource rewarding instruction.

The reward feedback information is used to indicate reward goods obtained due to the resource rewarding operation. In this embodiment of the present technology, after completing the resource rewarding operation, the user may obtain corresponding reward goods. The reward goods may be pre-configured by the publisher according to an actual case. The reward goods include virtual goods and/or physical goods. The physical goods may be mailed by the publisher to the user below the line. The virtual goods include at least one of a use right of a specified function, a setting right of a specified attribute, and an obtaining right of specified contents. For example, the use right of the specified function may be a use right of a function such as a chat surprise (e.g., bonus content) in an instant messaging application. The setting right of the specified attribute may be a setting right of an attribute such as an avatar decoration, a chat background, or a shadow effect. The obtaining right of the specified contents may be an obtaining right of contents such as a specified emoticon, a specified video, specified music, a specified picture, a specified article, or a specified APP.

In a possible implementation, this step includes the following steps:

(1). The background server determines, according to the value of the rewarded resource indicated in the resource rewarding instruction, reward goods corresponding to the value.

(2). The background server generates reward feedback information corresponding to the reward goods.

(3). The background server sends the reward feedback information to the resource consumer client.

Levels of obtained reward goods are different when values of rewarded resources are different. The value of the rewarded resource is positively correlated to the level of the reward goods. That is, a larger value of a rewarded resource indicates a high level of reward goods. For example, quality of the reward goods is better, a quantity of the reward goods is larger, a price of the reward goods is higher, a function of the reward goods is greater, an attribute effect of the reward goods is better, or contents of the reward goods are richer. On the contrary, a smaller value of a rewarded resource indicates a lower level of reward goods. In an example, it is assumed that the background server pre-stores reward goods A corresponding to the value $0<n\leq 10$ of the rewarded resource, reward goods B corresponding to the value $10<n\leq 50$ of the rewarded resource, and reward goods C corresponding to value $n>50$ of the rewarded resource. Levels of the reward goods A, B, and C are in ascending order. When the value of the rewarded resource is $n=50$, it can be determined that reward goods obtained by the user is reward goods B.

Step 607. The resource consumer client presents the reward feedback information.

The reward feedback information includes introduction information of the reward goods, or may include gratitude expression information of the publisher. The gratitude expression information may be configured by the publisher. For example, the gratitude expression information may be media contents such as characters, pictures, cartoons, or videos.

Figure 6C:
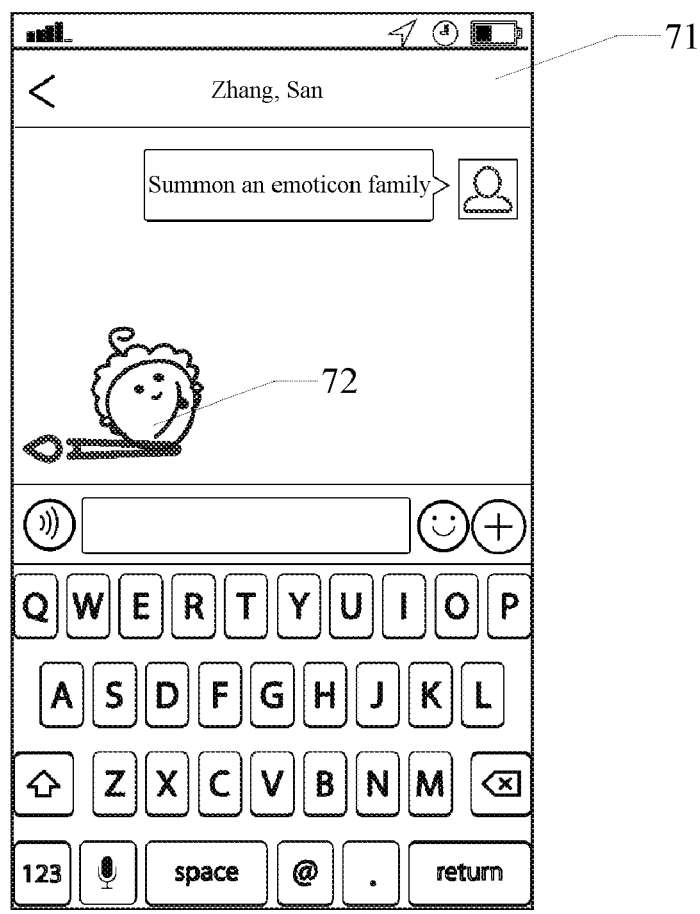

For example, as shown in FIG. 6B, after the user completes the payment, the resource consumer client and the background server exchange the reward feedback information, and then, a gratitude expression window 66 is displayed. The gratitude expression window 66 includes introduction information 67 of the reward goods "chat surprise (e.g., bonus content)" and gratitude expression information 68. With reference to FIG. 6C, after obtaining the chat surprise (e.g., bonus content) rewarded by the publisher, the user enters "summon an emoticon family" on a dialog box of the instant messaging application. That is, an animation effect of a chat surprise (e.g., bonus content) 72 appears on chat windows 71 of clients participating in the chat.

Optionally, the interaction method provided in this embodiment further includes the following step 608 to step 610.

Step 608. The background server obtains at least one piece of user information corresponding to a resource rewarding instruction that is successfully executed for the network resource.

Each piece of user information includes a user identifier and a value of a rewarded resource.

Step 609. The background server sends the at least one piece of user information to the resource consumer client.

Step 610. The resource consumer client sorts and displays the at least one user identifier according to the value of the rewarded resource.

The user identifier may be displayed on the presentation window of the network resource, to attract a resource rewarding operation of the user. Optionally, the resource consumer client sorts and displays the at least one user identifier in descending order of the values of the rewarded resources, so that the user is encouraged to reward more resources, thereby bringing more earnings to the publisher.

For example, as shown in FIG. 6B, the presentation window 61 displays an avatar 69 of at least one user completing the resource rewarding operation, and the user avatar 69 is arranged from the left to the right according to descending order of the value of the rewarded resource.

In addition, a time of performing step 608 to step 610 in this embodiment is not limited. For example, the background server may provide the at least one piece of user information to the resource consumer client when performing step 602. Correspondingly, the resource consumer client displays the user identifier on the presentation window of the network resource.

In conclusion, in the interaction method provided in this embodiment, a resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

In addition, in the interaction method provided in this embodiment, an identifier of a user completing a resource rewarding operation is displayed, helping to encourage a user to execute a resource rewarding operation. In addition, user identifiers are sorted and displayed in descending order of values of rewarded resources, helping to encourage the user to rewarding more resources, and bringing more earnings to the publisher.

In another optional embodiment provided based on the embodiment shown in FIG. 6A, a background server provides, to a resource publisher client, personal information of a resource consumer client sending a resource rewarding instruction; the resource publisher client displays the personal information, and sends, according to the personal information, a first communication message to the resource consumer client sending the resource rewarding instruction; and the resource consumer client receives and displays the first communication message. The personal information may include a user account, a user name, an avatar, gender, or the like. By means of the foregoing manner, the publisher can exchange deeper information with and communicate with a user completing a resource rewarding operation. Therefore, users are aggregated by means of the resource rewarding operation. Because the user completing the resource rewarding operation shows interests in the network resource released by the publisher, the user and the publisher may easily resonate with each other, thereby implementing effective communication.

In another optional embodiment provided based on the embodiment shown in FIG. 6A, a background server provides personal information of peer parties to a first resource consumer client and a second resource consumer client that already send a resource rewarding instruction; the first resource consumer client sends a second communication message to the second resource consumer client according to the personal information of the second resource consumer client; and the second resource consumer client receives and displays the second communication message. By means of the foregoing manner, interaction between users completing resource rewarding operation is implemented, providing a way of knowing and communication for users having same interests.

Figure 7:
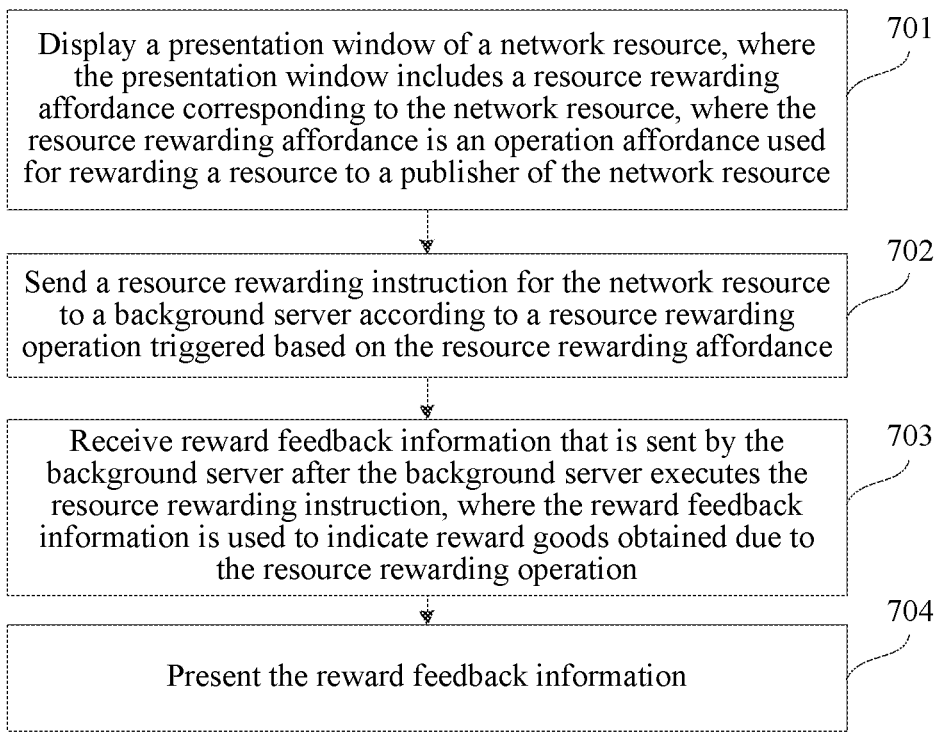
FIG. 7 is a flowchart of an interaction method according to another embodiment of the present technology.

Referring to FIG. 7, FIG. 7 is a flowchart of an interaction method according to another embodiment of the present technology. The interaction method may be applied to the resource consumer client in the implementation environment shown in FIG. 1. The interaction method may include the following steps.

Step 701. Display a presentation window of a network resource, where the presentation window includes a resource rewarding affordance corresponding to the network resource, where the resource rewarding affordance is an operation affordance used for rewarding a resource to a publisher of the network resource.

Step 702. Send a resource rewarding instruction for the network resource to a background server according to a resource rewarding operation triggered based on the resource rewarding affordance.

Step 703. Receive reward feedback information that is sent by the background server after the background server executes the resource rewarding instruction, where the reward feedback information is used to indicate reward goods obtained due to the resource rewarding operation.

Step 704. Present the reward feedback information.

In conclusion, in the interaction method provided in this embodiment, a resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

In another optional embodiment provided based on the embodiment shown in FIG. 7, the interaction method further includes:

receiving, from the background server, at least one piece of user information corresponding to a resource rewarding instruction that is successfully executed for the network resource, where each piece of user information includes a user identifier and a value of a rewarded resource; and sorting and displaying the at least one user identifier according to the value of the rewarded resource.

In another optional embodiment provided based on the embodiment shown in FIG. 7, the reward goods include virtual goods and/or physical goods; and the virtual goods include at least one of a use right of a specified function, a setting right of a specified attribute, and an obtaining right of specified contents.

Figure 8:
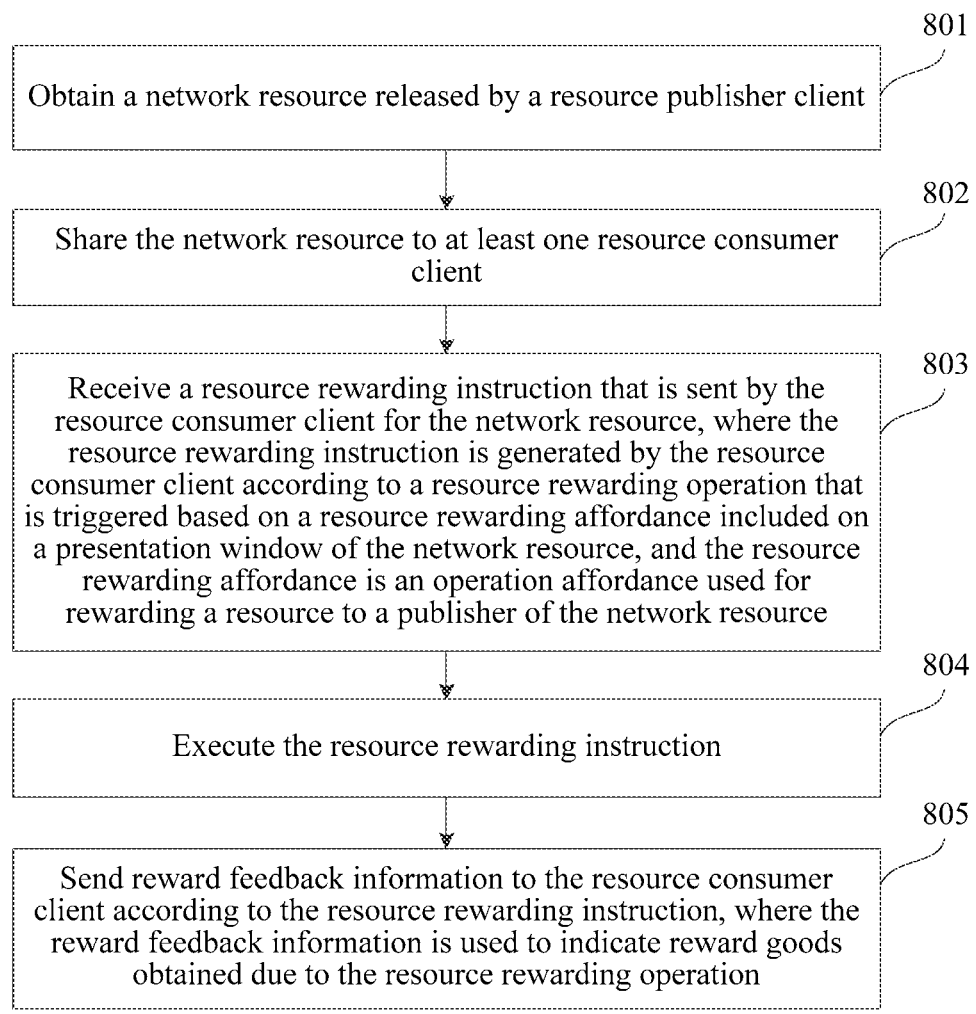
FIG. 8 is a flowchart of an interaction method according to another embodiment of the present technology.

Referring to FIG. 8, FIG. 8 is a flowchart of an interaction method according to another embodiment of the present technology. The interaction method may be applied to the background server in the implementation environment shown in FIG. 1. The interaction method may include the following steps.

Step 801. Obtain a network resource released by a resource publisher client.

Step 802. Share the network resource to at least one resource consumer client.

Step 803. Receive a resource rewarding instruction that is sent by the resource consumer client for the network resource, where the resource rewarding instruction is generated by the resource consumer client according to a resource rewarding operation that is triggered based on a resource rewarding affordance included on a presentation window of the network resource, and the resource rewarding affordance is an operation affordance used for rewarding a resource to a publisher of the network resource.

Step 804. Execute the resource rewarding instruction.

Step 805. Send reward feedback information to the resource consumer client according to the resource rewarding instruction, where the reward feedback information is used to indicate reward goods obtained due to the resource rewarding operation.

In conclusion, in the interaction method provided in this embodiment, a resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

In another optional embodiment provided based on the embodiment shown in FIG. 8, the interaction method further includes:

obtaining at least one piece of user information corresponding to a resource rewarding instruction that is successfully executed for the network resource, where each piece of user information includes a user identifier and a value of a rewarded resource; and sending the at least one piece of user information to the resource consumer client, where the resource consumer client is configured to sort and display the at least one user identifier according to the value of the rewarded resource.

In another optional embodiment provided based on the embodiment shown in FIG. 8, step 805 includes:

determining, according to the value of the rewarded resource indicated in the resource rewarding instruction, reward goods corresponding to the value;

generating reward feedback information corresponding to the reward goods; and sending the reward feedback information to the resource consumer client.

In another optional embodiment provided based on the embodiment shown in FIG. 8, step 804 includes:

transferring the rewarded resource indicated in the resource rewarding instruction from an account corresponding to the resource consumer client to an account corresponding to the resource publisher client.

In another optional embodiment provided based on the embodiment shown in FIG. 8, the reward goods include virtual goods and/or physical goods; and the virtual goods include at least one of a use right of a specified function, a setting right of a specified attribute, and an obtaining right of specified contents.

Based on the above, a method for rewarding publishers of network resources on a social network platform is performed at a client terminal of a user of the social network platform, the client terminal having one or more processors and memory. The client terminal displays a first network resource (e.g., image, emoticon pack, game, article, etc.) published by a first resource publisher (e.g., a public social network account holder or another user of the social network), the first network resource having been released to a plurality of users of the social network platform (e.g., the publisher publishes the network resource via the social network platform or over the web and the content is displayed on the client applications of the social network platform to users at large). The client terminal displays a resource rewarding affordance (e.g., a "reward" button) in association with (e.g., displayed concurrently with or adjacent to) the first network resource or an identifier of the first resource publisher. The client terminal detects user selection of the resource rewarding affordance while the resource rewarding affordance is displayed in association with the first network resource or the identifier of the first resource publisher. In accordance with a determination that the resource rewarding affordance has been selected while the resource rewarding affordance is displayed in association with the first network resource or the identifier of the first resource publisher, the client terminal initiates a resource rewarding operation to reward the first resource publisher on the social network platform, wherein the resource rewarding operation transfers at least one reward good from a social network account of the user to a social network account of the first resource publisher on the social network platform.

In some embodiments, in accordance with a determination that the resource rewarding operation to reward the first resource publisher has been completed successfully and a value of the reward is ascertained: the client terminal (e.g., at the instruction of the server that processed the reward operation) adds the user to a predefined social group of users on the social network platform that have provided rewards to the first resource publisher, and displays a group conversation interface for the predefined social group of users at the client terminal.

In some embodiments, the server ranks users in the predefined social group of users in accordance with respective values of the awards that the users have provided to the first resource publisher; and the client terminal displays, within the group conversation interface, identifiers of at least two of the users in the predefined social group in an order according to the ranking of the users in the predefined social group of users.

In some embodiments, the client terminal provides, in the group conversation interface, a publisher listing affordance for displaying a listing of resource publishers to which the user has provided rewards. The client terminal detects selection of the publisher listing affordance in the group conversation interface. In response to detecting selection of the publisher listing affordance in the group conversation interface, the client terminal displays the listing of resource publishers to which the user has provided rewards in the group conversation interface. The client terminal detects selection of a second resource publisher in the listing of resource publishers. In response to detecting selection of the second resource publisher in the listing of resource publishers, the client terminal shares a resource link to the second resource publisher to the predefined group of users on the social network platform. For example, the client terminal sends a chat message with the link to the network resource publisher or network resource in the chat message to the entire group of users so that others with similar interests can discover this publisher or resource as well.

In some embodiments, the client terminal displays a first collectable item (e.g., an image, an emoticon, a digital rights item, etc.) concurrently with the resource reward affordance while the resource rewarding affordance is displayed in association with the first network resource or the identifier of the first resource publisher, wherein the first collectable item is provided by the first resource publisher. The first collectable item is specially designed by the publisher to entice the users to provide a reward to collect the item. In accordance with a determination that the resource rewarding operation to reward the first resource publisher has been completed successfully (e.g., in accordance with a server confirmation of the reward operation being completed successfully), the client device (e.g., at the instruction of the server) the client terminal adds the collectable item to a pool of resources available for use to the user on the social network platform. For example, the user can use the item in chat messages with other users. In some embodiments, the first collectable item is one of a predefined set of collectable items provided by the first resource publisher. Prior to displaying the first collectable item, the user terminal selects the first collectable item from the predefined set of collectable items in accordance with predefined selection criteria. In some embodiments, selecting the first collectable item from the predefined set of collectable items in accordance with the predefined selection criteria includes: determining a subset of the predefined collectable items that are already collected by the user; and selecting a collectable item that has not been previously collected by the user as the first collectable item. In some embodiments, the criteria require that the first collectable item is randomly selected from the set of collectable items. In some embodiments, the first collectable item is randomly selected only when the user has collected all the other items in the set. Before that, the items are selected from the subset of items that are not yet collected by the user.

In some embodiments, the user registers a reward account, and sets the amount of reward that can be dispensed from the reward account for a given time period (e.g., each month or each day). In some embodiments, the resource reward affordance only registers the user's wish to provide a reward, but does not require the user to specify the amount. Instead, the amount of reward for each publisher or resource is determined by the server based on preset criteria and conditions. For example, in some embodiments, the reward are dispensed only when the publisher has received a preset number of thumbs ups from the user (e.g., indicated by selection of the resource reward affordance) for resources published by the publisher. In some embodiments, the amount of reward is split between the publishers that are eligible to receive reward at the end of the preset time period, or when the condition for reward is met (e.g., when the fifth thumbs up is detected). In some embodiments, the award is only dispensed when the publisher does not receive a preset minimum amount of awards from others by a certain deadline (e.g., to support unpopular publishers, and cause a big month end surprise for the publisher when many users choose this option).

In some embodiments, a bonus content item is provided to user who makes a donation or reward to a publisher. In some embodiments, the bonus content is also collectable and selected from a predefined set of collectable content items. In some embodiments, bonus items can be called and used in chat messages using a keyword.

The above method is just illustrative, and other details and features are disclosed with respect to other embodiments described herein. The features described with respect to different embodiments can be combined without limitation in various embodiments. The actions performed by servers may be reasonably apparent from the corresponding actions of the client terminal to a person of ordinary skills in the art, and are not repeated herein in the interest of brevity.

Figure 9A:
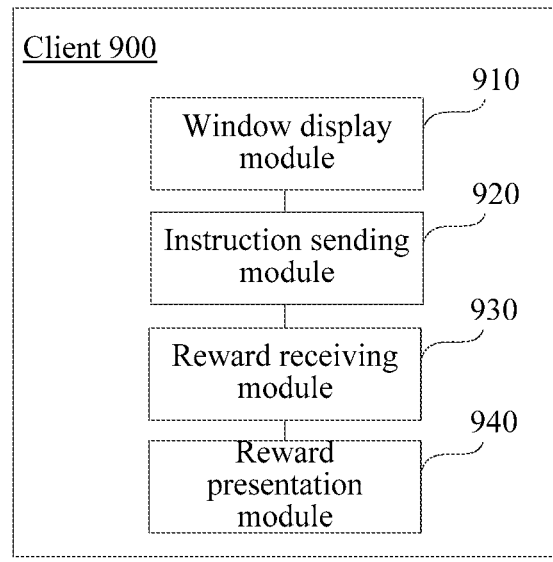
FIG. 9A is a structural block diagram of a client according to an embodiment of the present technology.

Referring to FIG. 9A, FIG. 9A is a structural block diagram of a client according to an embodiment of the present technology. The client may be the resource consumer client in the implementation environment shown in FIG. 1. As shown in FIG. 9A, the client 900 includes a window display module 910, an instruction sending module 920, a reward receiving module 930, and a reward presentation module 940.

The window display module 910 is configured to display a presentation window of a network resource, where the presentation window includes a resource rewarding affordance corresponding to the network resource, and the resource rewarding affordance is an operation affordance used for rewarding a resource to a publisher of the network resource.

The instruction sending module 920 is configured to send a resource rewarding instruction for the network resource to a background server according to a resource rewarding operation triggered based on the resource rewarding affordance.

The reward receiving module 930 is configured to receive reward feedback information that is sent by the background server after the background server executes the resource rewarding instruction, where the reward feedback information is used to indicate reward goods obtained due to the resource rewarding operation.

The reward presentation module 940 is configured to present the reward feedback information.

In conclusion, in the client provided in this embodiment, a resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

Figure 9B:
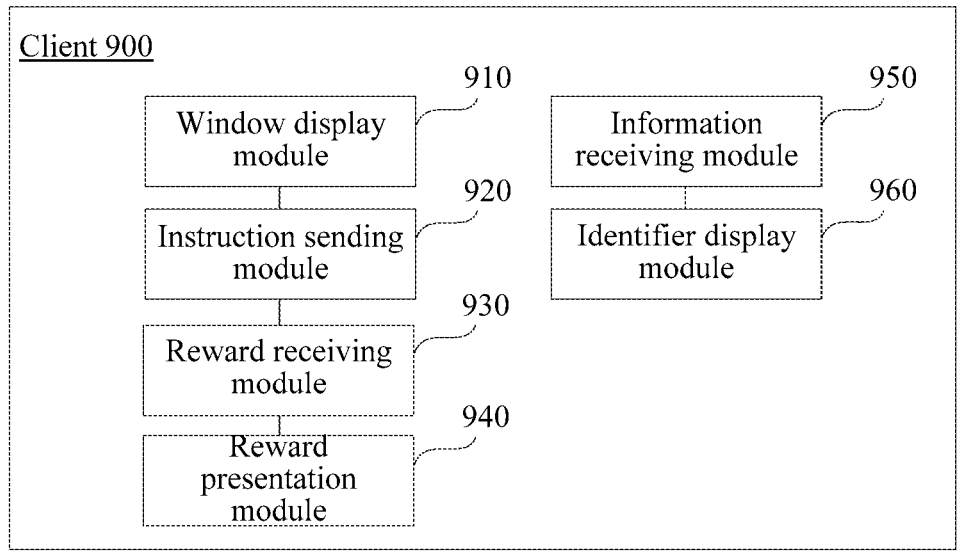
FIG. 9B is a structural block diagram of a client according to another embodiment of the present technology.

In another optional embodiment provided based on the embodiment shown in FIG. 9A, as shown in FIG. 9B, the client 900 further includes an information receiving module 950 and an identifier display module 960.

The information receiving module 950 is configured to receive, from the background server, at least one piece of user information corresponding to a resource rewarding instruction that is successfully executed for the network resource, where each piece of user information includes a user identifier and a value of a rewarded resource.

The identifier display module 960 is configured to sort and display the at least one user identifier according to the value of the rewarded resource.

In another optional embodiment provided based on the embodiment shown in FIG. 9A, the reward goods include virtual goods and/or physical goods; and the virtual goods include at least one of a use right of a specified function, a setting right of a specified attribute, and an obtaining right of specified contents.

Figure 10A:
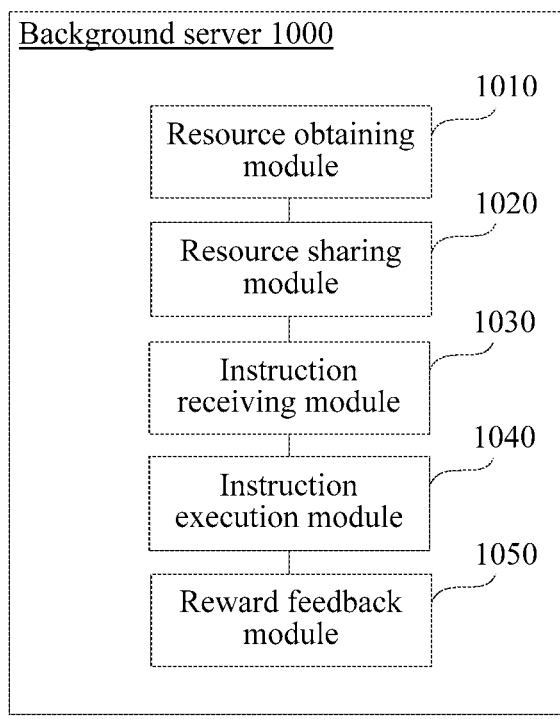
FIG. 10A is a structural block diagram of a background server according to an embodiment of the present technology.

Referring to FIG. 10A, FIG. 10A is a structural block diagram of a background server according to an embodiment of the present technology. The background server may be the background server 140 in the implementation environment shown in FIG. 1. As shown in FIG. 10A, the background server 1000 includes a resource obtaining module 1010, a resource sharing module 1020, an instruction receiving module 1030, an instruction execution module 1040, and a reward feedback module 1050.

The resource obtaining module 1010 is configured to obtain a network resource released by a resource publisher client.

The resource sharing module 1020 is configured to share the network resource to at least one resource consumer client.

The instruction receiving module 1030 is configured to receive a resource rewarding instruction that is sent by the resource consumer client for the network resource, where the resource rewarding instruction is generated by the resource consumer client according to a resource rewarding operation that is triggered based on a resource rewarding affordance included on a presentation window of the network resource, and the resource rewarding affordance is an operation affordance used for rewarding a resource to a publisher of the network resource.

The instruction execution module 1040 is configured to execute the resource rewarding instruction.

The reward feedback module 1050 is configured to send reward feedback information to the resource consumer client according to the resource rewarding instruction, where the reward feedback information is used to indicate reward goods obtained due to the resource rewarding operation.

In conclusion, in the server provided in this embodiment, a resource rewarding affordance corresponding to a network resource is provided to reward a resource to a publisher of the network resource, and reward goods are provided to a user completing a resource rewarding operation, thereby resolving problems in the existing technology that utilization and a propagation rate of a paid network resource are relatively low. In addition, by means of a resource rewarding function, an objective of considering both earnings of a publisher and propagation and use of a network resource is achieved, so that the publisher can obtain earnings when a user can obtain the network resource for free. In addition, because the user may obtain a corresponding reward after completing the resource rewarding operation, the user is better encouraged to execute the resource rewarding operation for the publisher.

Figure 10B:
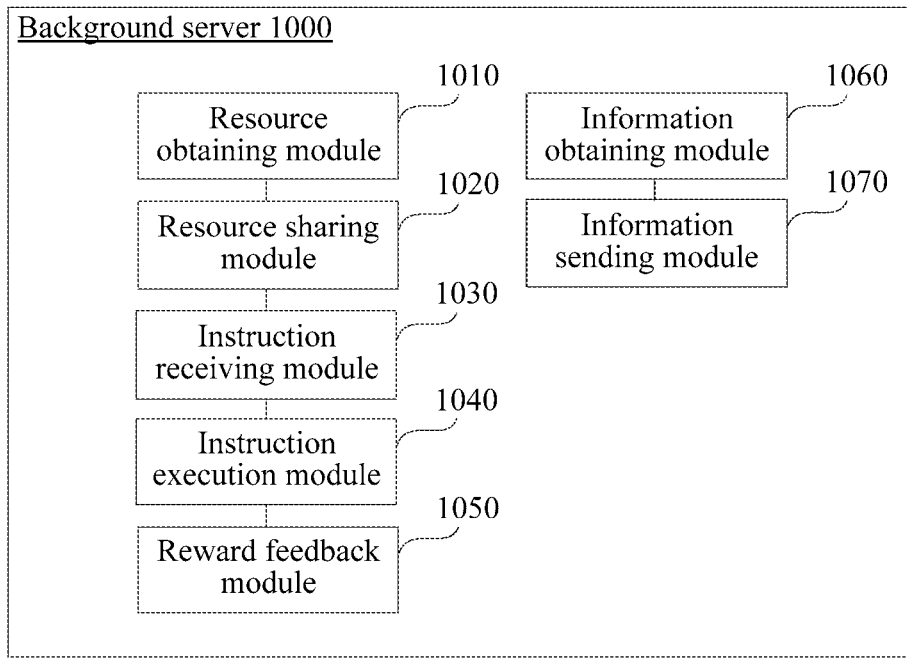
FIG. 10B is a structural block diagram of a background server according to another embodiment of the present technology.

In another optional embodiment provided based on the embodiment shown in FIG. 10A, as shown in FIG. 10B, the background server 1000 further includes an information obtaining module 1060 and an information sending module 1070.

The information obtaining module 1060 is configured to obtain at least one piece of user information corresponding to a resource rewarding instruction that is successfully executed for the network resource, where each piece of user information includes a user identifier and a value of a rewarded resource.

The information sending module 1070 is configured to send the at least one piece of user information to the resource consumer client, where the resource consumer client is configured to sort and display the at least one user identifier according to the value of the rewarded resource.

Figure 10C:
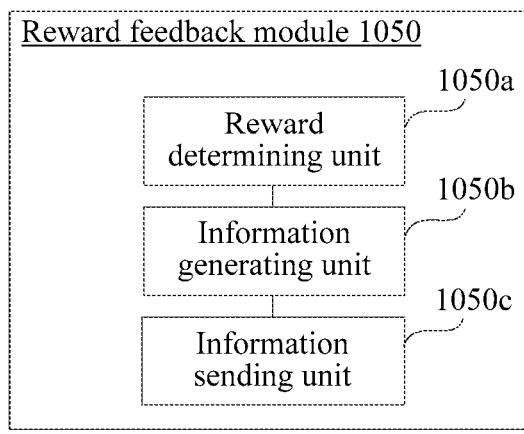
FIG. 10C is a structural block diagram of a reward feedback module involved in an embodiment of the present technology.

In another optional embodiment provided based on the embodiment shown in FIG. 10A, as shown in FIG. 10C, the reward feedback module 1050 includes a reward determining unit 1050*a*, an information generating unit 1050*b*, and an information sending unit 1050*c*.

The reward determining unit 1050*a* is configured to determine, according to the value of the rewarded resource indicated in the resource rewarding instruction, reward goods corresponding to the value.

The information generating unit 1050*b* is configured to generate reward feedback information corresponding to the reward goods.

The information sending unit 1050*c* is configured to send the reward feedback information to the resource consumer client.

In another optional embodiment based on the embodiment shown in FIG. 10A, the instruction execution module 1040 is specifically configured to:

transfer the rewarded resource indicated in the resource rewarding instruction from an account corresponding to the resource consumer client to an account corresponding to the resource publisher client.

In another optional embodiment provided based on the embodiment shown in FIG. 10A, the reward goods include virtual goods and/or physical goods; and the virtual goods include at least one of a use right of a specified function, a setting right of a specified attribute, and an obtaining right of specified contents.

It should be noted that: the client and the background server provided in the foregoing embodiments are merely described by using an example of division of the foregoing function modules. In an actual application, the foregoing functions can be allocated to different function modules and implemented according to a requirement, that is, an inner structure of the device is divided into different function modules to implement all or some of the functions described above.

In an exemplary embodiment, a non-transitory computer readable storage medium including an instruction is provided, for example, a memory including an instruction. The instruction may be executed by a processor of a terminal, to implement steps on a side of a resource publisher client or a resource consumer client in the method embodiments, or the instruction is executed by a server, to implement steps on a side of a background server in the method embodiments. For example, the non-transitory computer readable storage medium may be a ROM, a RAM, a CD-ROM, a magnetic tape, a floppy disk, or an optical data storage device.

It should be understood that "multiple" in this specification refers to two or more than two. "And/or" describes an association relationship between associated objects and represents that three relationships may exist. For example, A and/or B may represent the following three cases: Only A exists, both A and B exist, and only B exists. A character "/" generally represents that associated objects are in an "or" relationship.

The sequence numbers of the foregoing embodiments of the present technology are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a ROM, a magnetic disk, or an optical disc.

The foregoing descriptions are merely exemplary embodiments of the present technology, but are not intended to limit the present technology. Any modification, equivalent replacement, and improvement made without departing from the spirit and principle of the present disclosure shall fall within the protection scope of the present disclosure.

What is claimed is:

1. A method performed at a client terminal having one or more processors and memory, wherein the client terminal is associated with a user having a first user account of a social network platform, the method comprising:
   displaying, in a chat interface of the social network platform on the client terminal, an emoticon package published by a first resource publisher, wherein the emoticon package includes a plurality of emoticons and the emoticon package is released to a plurality of users of the social network platform, including the user;
   receiving a first user input selecting a first emoticon from the emoticon package;
   displaying, in the chat interface of the social network platform, a first instant message sent to a second user account of the social network platform, wherein the first instant message includes the first emoticon;
   in response to the sending of the first instant message to the second user account:
      displaying a resource rewarding affordance in association with the emoticon package and an identifier of the first resource publisher;
      detecting user selection of the resource rewarding affordance;
      responsive to the user selection, initiating a resource rewarding operation to reward the first resource publisher on the social network platform, wherein the resource rewarding operation transfers a reward from the first user account to a user account of the social network platform associated with the first resource publisher; and
      in response to the resource rewarding operation, displaying, in the chat interface of the social network platform, a second instant message sent from the user account of the first resource publisher, wherein the second instant message includes: (1) a reward comprising a bonus emoticon that is distinct from the plurality of emoticons in the emoticon package and (2) instructions for causing the bonus emoticon to be displayed in the chat interface, the instructions including a predefined phrase and a date limit by which the predefined phrase is to be input to the chat interface;
   receiving, in the chat interface within the date limit, a second user input consisting of the predefined phrase; and
   in response to the second user input, displaying the bonus emoticon in the chat interface.

2. The method of claim 1, further comprising:
   in accordance with a determination that the resource rewarding operation to reward the first resource publisher has been completed successfully and a value of the reward is ascertained:
      adding the user to a predefined social group of users on the social network platform that have provided rewards to the first resource publisher; and
      displaying a group conversation interface for the predefined social group of users at the client terminal.

3. The method of claim 2, further comprising:
   receiving ranking of users in the predefined social group of users in accordance with respective values of the awards that the users have provided to the first resource publisher; and
   displaying, within the group conversation interface, identifiers of at least two of the users in the predefined social group in an order according to the ranking of the users in the predefined social group of users.

4. The method of claim 2, further comprising:
   providing, in the group conversation interface, a publisher listing affordance for displaying a listing of resource publishers to which the user has provided rewards;
   detecting selection of the publisher listing affordance in the group conversation interface;
   in response to detecting selection of the publisher listing affordance in the group conversation interface, displaying the listing of resource publishers to which the first user has provided rewards in the group conversation interface;
   detecting selection of a second resource publisher in the listing of resource publishers; and
   in response to detecting selection of the second resource publisher in the listing of resource publishers, sharing a resource link to the second resource publisher to the predefined group of users on the social network platform.

5. The method of claim 1, further comprising:
   displaying a first collectable item concurrently with the resource reward affordance while the resource rewarding affordance is displayed in association with the first network resource or the identifier of the first resource publisher, wherein the first collectable item is provided by the first resource publisher; and
   in accordance with a determination that the resource rewarding operation to reward the first resource publisher has been completed successfully, adding the collectable item to a pool of resources available for use by the user on the social network platform.

6. The method of claim 5, wherein the first collectable item is one of a predefined set of collectable items provided by the first resource publisher, and the method further comprises:
   prior to displaying the first collectable item, selecting the first collectable item from the predefined set of collectable items in accordance with predefined selection criteria.

7. The method of claim 6, wherein selecting the first collectable item from the predefined set of collectable items in accordance with the predefined selection criteria includes:
   determining a subset of the predefined collectable items that are already collected by the user; and
   selecting a collectable item that has not been previously collected by the user as the first collectable item.

8. A client terminal associated with a user having a first user account of a social network platform, the client terminal comprising:
   one or more processors; and
   memory storing instructions, which, when executed by the one or more processors, cause the client terminal to perform operations comprising:
      displaying, in a chat interface of the social network platform on the client terminal, an emoticon package published by a first resource publisher, wherein the emoticon package includes a plurality of emoticons and the emoticon package is released to a plurality of users of the social network platform, including the user;
      receiving a first user input selecting a first emoticon from the emoticon package;
      displaying, in the chat interface of the social network platform, a first instant message sent to a second user account of the social network platform, wherein the first instant message includes the first emoticon;
      in response to the sending of the first instant message to the second user account:

displaying a resource rewarding affordance in association with the emoticon package and an identifier of the first resource publisher;

detecting user selection of the resource rewarding affordance;

responsive to the user selection, initiating a resource rewarding operation to reward the first resource publisher on the social network platform, wherein the resource rewarding operation transfers a reward from the first user account to a user account of the social network platform associated with the first resource publisher; and in response to the resource rewarding operation, displaying, in the chat interface of the social network platform, a second instant message sent from the user account of the first resource publisher, wherein the second instant message includes: (1) a reward comprising a bonus emoticon that is distinct from the plurality of emoticons in the emoticon package and (2) instructions for causing the bonus emoticon to be displayed in the chat interface, the instructions including a predefined phrase and a date limit by which the predefined phrase is to be input to the chat interface;

receiving, in the chat interface within the date limit, a second user input consisting of the predefined phrase; and in response to the second user input, displaying the bonus emoticon in the chat interface.

9. The client terminal of claim 8, the operations further comprising:

in accordance with a determination that the resource rewarding operation to reward the first resource publisher has been completed successfully and a value of the reward is ascertained:

adding the user to a predefined social group of users on the social network platform that have provided rewards to the first resource publisher; and displaying a group conversation interface for the predefined social group of users at the client terminal.

10. The client terminal of claim 9, the operations further comprising:

receiving ranking of users in the predefined social group of users in accordance with respective values of the awards that the users have provided to the first resource publisher; and displaying, within the group conversation interface, identifiers of at least two of the users in the predefined social group in an order according to the ranking of the users in the predefined social group of users.

11. The client terminal of claim 9, the operations further comprising:

providing, in the group conversation interface, a publisher listing affordance for displaying a listing of resource publishers to which the user has provided rewards;

detecting selection of the publisher listing affordance in the group conversation interface;

in response to detecting selection of the publisher listing affordance in the group conversation interface, displaying the listing of resource publishers to which the user has provided rewards in the group conversation interface;

detecting selection of a second resource publisher in the listing of resource publishers; and in response to detecting selection of the second resource publisher in the listing of resource publishers, sharing a resource link to the second resource publisher to the predefined group of users on the social network platform.

12. The client terminal of claim 8, the operations further comprising:

displaying a first collectable item concurrently with the resource reward affordance while the resource rewarding affordance is displayed in association with the first network resource or the identifier of the first resource publisher, wherein the first collectable item is provided by the first resource publisher; and in accordance with a determination that the resource rewarding operation to reward the first resource publisher has been completed successfully, adding the collectable item to a pool of resources available for use by the user on the social network platform.

13. The client terminal of claim 12, wherein the first collectable item is one of a predefined set of collectable items provided by the first resource publisher, and the operations further comprise:

prior to displaying the first collectable item, selecting the first collectable item from the predefined set of collectable items in accordance with predefined selection criteria.

14. The client terminal of claim 13, wherein selecting the first collectable item from the predefined set of collectable items in accordance with the predefined selection criteria includes:

determining a subset of the predefined collectable items that are already collected by the user;

selecting a collectable item that has not been previously collected by the user as the first collectable item.

15. A non-transitory computer-readable storage medium, wherein the computer-readable storage medium stores instructions which, when executed by one or more processors of a client terminal that is associated with a user having a first user account of a social network platform, cause the client terminal to perform operations comprising:

displaying, in a chat interface of the social network platform on the client terminal, an emoticon package published by a first resource publisher, wherein the emoticon package includes a plurality of emoticons and the emoticon package is released to a plurality of users of the social network platform, including the user;

receiving a first user input selecting a first emoticon from the emoticon package;

displaying, in the chat interface of the social network platform, a first instant message sent to a second user account of the social network platform, wherein the first instant message includes the first emoticon;

in response to the sending of the first instant message to the second user account:

displaying a resource rewarding affordance in association with the emoticon package and an identifier of the first resource publisher;

detecting user selection of the resource rewarding affordance;

responsive to the user selection, initiating a resource rewarding operation to reward the first resource publisher on the social network platform, wherein the resource rewarding operation transfers a reward from the first user account to a user account of the social network platform associated with the first resource publisher; and in response to the resource rewarding operation, displaying, in the chat interface of the social network platform, a second instant message sent from the user account of the first resource publisher, wherein the second instant message includes: (1) a reward comprising a bonus emoticon that is distinct from the plurality of emoticons in the emoticon package and (2) instructions for causing the bonus emoticon to be displayed in the chat interface, the instructions including a predefined phrase and a date limit by which the predefined phrase is to be input to the chat interface;

receiving, in the chat interface within the date limit, a second user input consisting of the predefined phrase; and in response to the second user input, displaying the bonus emoticon in the chat interface.

16. The non-transitory computer-readable storage medium of claim 15, the operations further comprising:

in accordance with a determination that the resource rewarding operation to reward the first resource publisher has been completed successfully and a value of the reward is ascertained:

adding the user to a predefined social group of users on the social network platform that have provided rewards to the first resource publisher; and displaying a group conversation interface for the predefined social group of users at the client terminal.

17. The non-transitory computer-readable storage medium of claim 16, the operations further comprising:

receiving ranking of users in the predefined social group of users in accordance with respective values of the awards that the users have provided to the first resource publisher; and displaying, within the group conversation interface, identifiers of at least two of the users in the predefined social group in an order according to the ranking of the users in the predefined social group of users.

18. The non-transitory computer-readable storage medium of claim 16, the operations further comprising:

providing, in the group conversation interface, a publisher listing affordance for displaying a listing of resource publishers to which the user has provided rewards;

detecting selection of the publisher listing affordance in the group conversation interface;

in response to detecting selection of the publisher listing affordance in the group conversation interface, displaying the listing of resource publishers to which the user has provided rewards in the group conversation interface;

detecting selection of a second resource publisher in the listing of resource publishers; and in response to detecting selection of the second resource publisher in the listing of resource publishers, sharing a resource link to the second resource publisher to the predefined group of users on the social network platform.

19. The non-transitory computer-readable storage medium of claim 15, the operations further comprising:

displaying a first collectable item concurrently with the resource reward affordance while the resource rewarding affordance is displayed in association with the first network resource or the identifier of the first resource publisher, wherein the first collectable item is provided by the first resource publisher; and in accordance with a determination that the resource rewarding operation to reward the first resource publisher has been completed successfully, adding the collectable item to a pool of resources available for use by the user on the social network platform.

20. The non-transitory computer-readable storage medium of claim 19, wherein:

the first collectable item is one of a predefined set of collectable items provided by the first resource publisher, and the operations further comprise:

prior to displaying the first collectable item, selecting the first collectable item from the predefined set of collectable items in accordance with predefined selection criteria, the selecting including:

determining a subset of the predefined collectable items that are already collected by the user; and selecting a collectable item that has not been previously collected by the user as the first collectable item.

* * * * *